US005317308A

United States Patent [19]

Tribbey et al.

[11] Patent Number: 5,317,308

[45] Date of Patent: May 31, 1994

[54] CIRCUIT SUPPORTING MECHANICAL SHOCK ISOLATOR FOR RADIO RECEIVER

[75] Inventors: David A. Tribbey, Boynton Beach; Allen D. Hertz, Boca Raton; Mario A. Rivas, W. Palm Beach, all of Fla.

[73] Assignee: Motorola, Inc., Schaumburg, Ill.

[21] Appl. No.: 878,126

[22] Filed: May 4, 1992

[51] Int. Cl.[5] ................................ H04Q 7/00

[52] U.S. Cl. ............................ 340/825.44; 340/652; 455/347

[58] Field of Search ..................... 340/825.44, 825.46, 340/531, 540, 532, 635, 650, 651, 652, 669; 73/658; 174/521, 59; 439/65, 66, 77, 85, 86, 91; 248/550, 562, 636; 324/537; 361/400, 402, 403, 417, 397, 398; 206/328, 573, 521.6, 521; 455/226.1, 343, 344, 347

[56] References Cited

U.S. PATENT DOCUMENTS 3,443,661 5/1969 Van Sciver .
4,412,272 10/1983 Wedertz et al. .................. 174/52.1
4,547,834 10/1985 Dumont et al. ..................... 439/66
4,558,427 12/1985 Takeuchi et al. ................. 364/708
4,577,735 3/1986 Mooney ........................... 188/268
4,578,612 3/1986 Mooney ........................... 310/348
4,694,555 9/1987 Russell et al. .
5,049,084 9/1991 Bakke ............................ 439/66
5,175,491 12/1992 Ewers ............................ 439/91

OTHER PUBLICATIONS

IBM Technical Disclosure Bulletin, "Wire Fan-Out Device Carrier", vol. 21, No. 6, Nov. 1978, pp. 2230-2231.
"8 more printed circuit guides" Product Engineering, Jun. 10, 1963, pp. 96-97.
Motorola, Inc., Motorola Technical Developments, vol. 15, May 1992, ®1992, p. 89.

*Primary Examiner*—Donald J. Yusko
*Assistant Examiner*—John E. Giust
*Attorney, Agent, or Firm*—R. Louis Breeden; Thomas G. Berry

[57] ABSTRACT

An electronic device (100) includes a housing (222), a circuit supporting substrate (902) within the housing (222) and mechanically coupled thereto, and electronic circuitry (904) mechanically coupled to the circuit supporting substrate (902). A mechanical shock isolator (502) is located within the housing (222), and is mechanically coupled to the circuit supporting substrate (902) for substantially increasing the natural mechanical frequency of vibration of the circuit supporting substrate (902). The mechanical shock isolator (502) includes an electrically conductive structure (504) that is electrically coupled to the electronic circuitry (904). Additionally, a method is provided for sensing the integrity of an electrical loop formed between the electrically conductive structure (504) and the electronic circuitry (904).

20 Claims, 5 Drawing Sheets

-PRIOR ART-

-PRIOR ART-

CIRCUIT SUPPORTING MECHANICAL SHOCK ISOLATOR FOR RADIO RECEIVER

FIELD OF THE INVENTION

This invention relates generally to mechanical shock isolation in electronic devices, and more particularly, to a mechanical shock isolator and a method for improving the reliability of an electronic device.

BACKGROUND OF THE INVENTION

Reliability of operation is an important consideration for modern electronic devices, e.g., selective call receivers. One aspect of reliability is the device's ability to continue to function properly after sudden mechanical impacts and shocks, e.g., dropping the unit onto a hard surface. Modern selective call receivers, e.g., pagers, generally include relatively thin printed circuit boards, housings which are typically made of a plastic type material, and fragile electronic components. The plastic housing's front and back planes and internal printed circuit boards mounted within the housing typically have a low mechanical frequency response to sudden impacts, resulting in relatively large deflections. The deflecting front and back planes, as well as the deflecting printed circuit boards, can impact with each other, resulting in primary and secondary impacts with the components supported by the printed circuit boards. Certain ones of these components are fragile in nature, e.g., constructed of quartz, ceramic, and silicon, making them especially susceptible to failure due to mechanical shocks. Additionally, each of these components also has a natural mechanical frequency response to impact that can amplify the incoming shock and cause serious damage to the component.

Furthermore, modern low volumetric selective call receivers, e.g., such as in credit card form-factors, do not permit height tolerances between the printed circuit boards and the housing front and back planes to accommodate large deflections. As a result, sudden mechanical shocks typically cause primary and secondary impacts between the deflecting structures. This can result in unit failures. For example, large impacts, whether primary or secondary, can create detached or broken solder joints in integrated circuits, ceramic filters, and other components. Further, excessive printed circuit board deflections can overstress and fatigue solder joints resulting in failure.

The current method of providing shock isolation within a selective call receiver is to place one or more pieces of shock isolating material in selected areas. Unfortunately, this approach has provided a limited amount of shock isolation in a single direction only, and does not solve all of the problems described above. Further, if during manufacturing of the selective call receiver, one or more of the pieces of shock isolating material are not correctly placed or missing in the selected areas, the final delivered product is again susceptible to failures due to mechanical shock as discussed above.

Thus, what is needed is an apparatus for isolating the electronic device and its constituent parts from mechanical shock by reducing the deflections of the constituent parts. Preferably, the electronic device should also externally indicate if the shock isolating apparatus is internally misplaced or missing to reduce the possibility for manufacturing defects and to enhance the reliability of the delivered product.

SUMMARY OF THE INVENTION

One aspect of the present invention is a selective call receiver for receiving transmitted messages. The selective cell receiver comprises a housing, and a circuit supporting substrate within the housing and mechanically coupled thereto. The selective cell receiver further comprises electronic circuitry, at least a portion of which is mechanically coupled to the circuit supporting substrate. The electronic circuitry includes at least one of a receiving element for receiving a message comprising an address, a decoder coupled to the receiving element for decoding the received message and for determining if the received address matches a predetermined address, and an alert element coupled to the decoding means for generating an alert if the received address matches the predetermined address. The selective cell receiver further comprises a mechanical shock isolating element within the housing and mechanically coupled to the circuit supporting substrate for substantially increasing the natural frequency of vibration of the circuit supporting substrate. The mechanical shock isolation means includes an electrically conductive layer being electrically coupled to the electronic circuitry. The electronic circuitry includes control means capable of being electrically coupled to the electrically conductive layer of the mechanical shock isolation means to form an electrical loop circuit for sensing electrical integrity of the electrical loop circuit to determine when the mechanical shock isolation means is misplaced or missing in the housing.

Another respect of the present invention is a communication receiver for receiving transmitted messages. The communication receiver comprises a housing, and a circuit supporting substrate within the housing and mechanically coupled thereto. The communication receiver further comprises electronic circuitry, at least a portion of which is mechanically coupled to the circuit supporting substrate. The electronic circuitry includes receiving means for receiving a message. The communication receiver comprises mechanical shock isolation means within the housing and mechanically coupled to the circuit supporting substrate for substantially increasing the natural frequency of vibration of the circuit supporting substrate. The mechanical shock isolation means includes an electrically conductive layer being electrically coupled to the electronic circuitry. The electronic circuitry includes control means capable of being electrically coupled to the electrically conductive layer of the mechanical shock isolation means to form an electrical loop circuit for sensing electrical integrity of the electrical loop circuit to determine when the mechanical shock isolation means is misplaced or missing in the housing.

DESCRIPTION OF A PREFERRED EMBODIMENT

Figure 1:
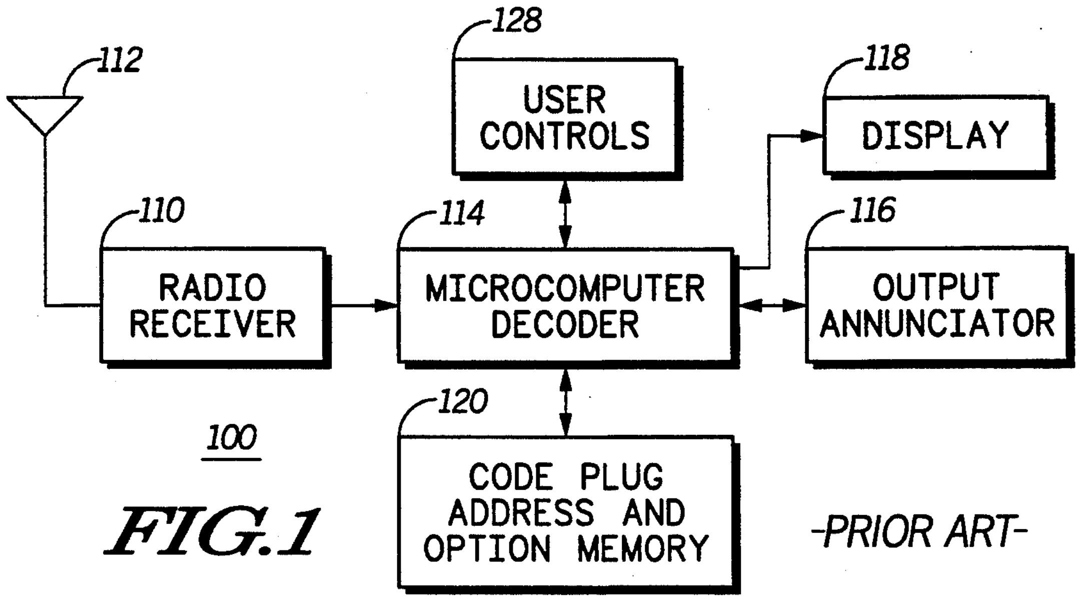
FIG. 1 is a block diagram of a prior art paging receiver.

FIG. 1 is an electrical block diagram of a selective call receiver, e.g. a pager 100. It includes radio receiver circuitry 110 which receives signals via an antenna 112. The received signals include paging information. Selective call receivers can respond to transmitted information containing various combinations of tone, tone and voice, or data messages in a variety of modes. This information may be transmitted using several paging coding schemes and message formats.

The output of the radio receiver circuitry 110 is applied to a microcomputer decoder 114 which processes the information contained in the received signals, to decode any received message. As can be seen, the microcomputer decoder 114 communicates with an output annunciator 116, such as a transducer or speaker, to alert a user that a message has been received, with a display 118, such as a liquid crystal display (LCD), to present a message via the display 118, and with a code plug address and option memory to retrieve predetermined address and function information. Normally, after a received address matches a predetermined address in the pager 100, the output annunciator 116 alerts the user that a message has been received. The user can activate user controls 128, such as buttons or switches, to invoke functions in the pager 100, and optionally to view the received message on the display 118. The operation of a paging receiver of the general type shown in FIG. 1 is well known and is more fully described in U.S. Pat. No. 4,518,961, issued May 21, 1985, entitled "Universal Paging Device with Power Conservation", which is assigned to the same assignee as the present invention and is incorporated herein by reference.

Figure 2:
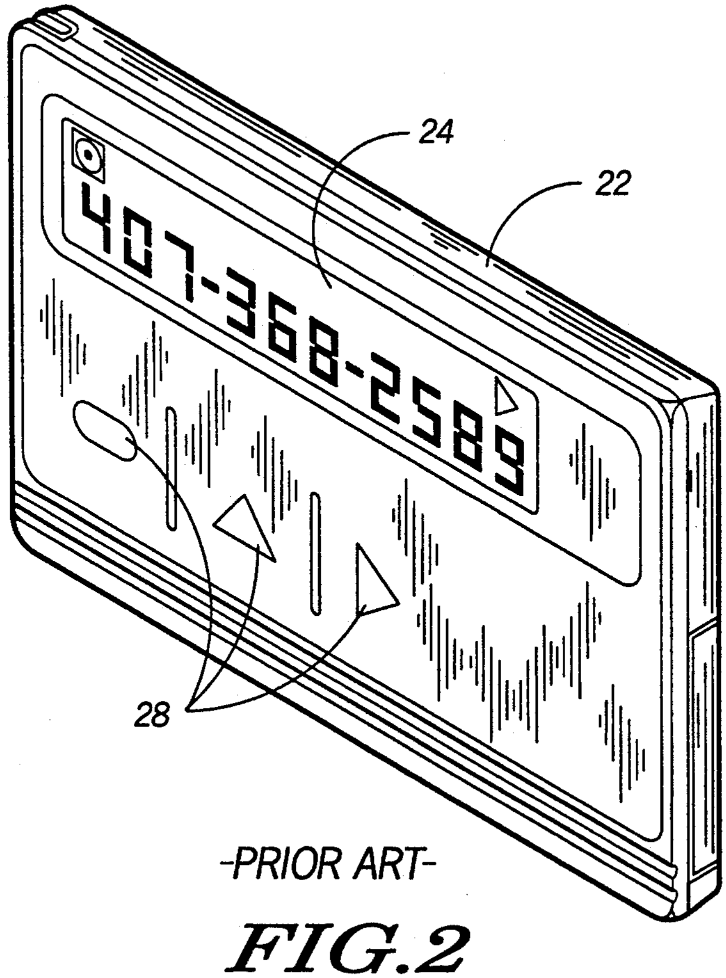
FIG. 2 is an isometric view of a prior art paging receiver in a credit card format.

FIG. 2 is an isometric view of a paging receiver constructed in a low volumetric (e.g. credit card) format. As can be seen, the pager includes a housing 222 having a front plane 240 and a back plane 242. A display 118 is visible through an aperture in the front plane 240, and user operated controls 128 are also provided.

Figure 3:
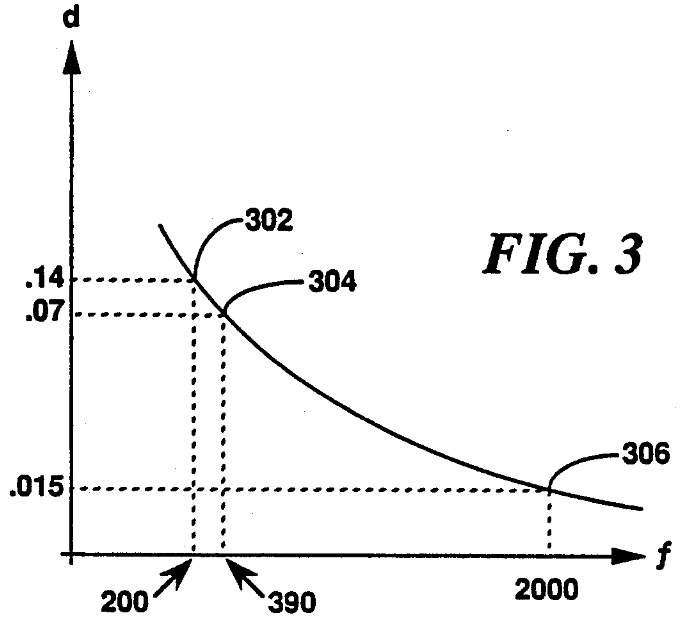
FIG. 3 is a graph illustrating a relationship of deflection (d) versus natural mechanical frequency response (f).
Figure 4:
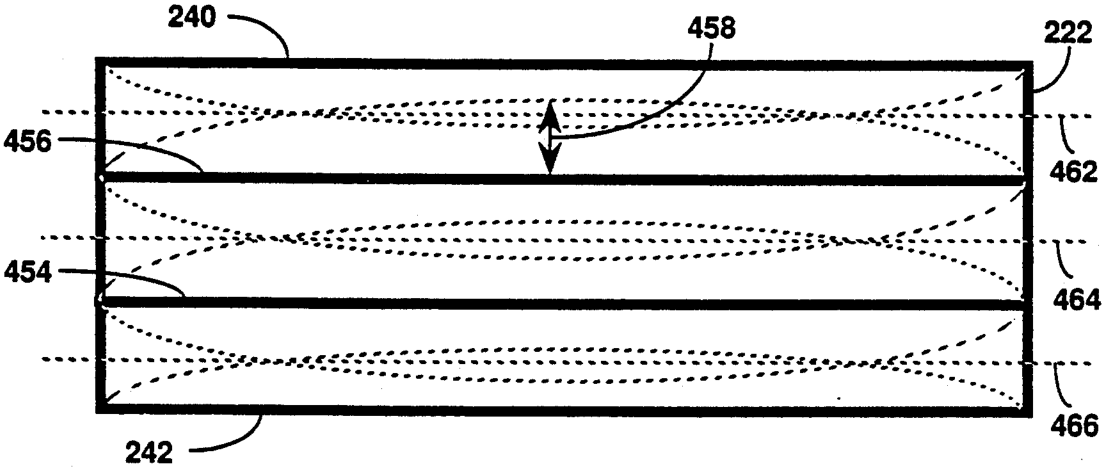
FIG. 4 is a cross-sectional view of a pager housing having front and back planes and two circuit supporting substrates, illustrating deflections and secondary impact zones.

FIG. 3 is a graph illustrating the relationship between deflection due to an impulse from a mechanical shock and the natural mechanical frequency response of a structure. Also, FIG. 4 is a cross-sectional view of the pager housing 222 having front and back planes 240, 242, and two circuit supporting substrates, 454, 456, being mechanically coupled to the housing 222. For the graph, the impulse from the mechanical shock is kept relatively constant, such as representing a forty eight inch drop onto a concrete and steel floor. The X-axis on the graph corresponds to the natural mechanical frequency (f) of a structure, such as circuit supporting substrates 454, 456, (FIG. 4) mechanically coupled to the housing 222, and the front and back planes 240, 242, of the housing 222. The Y-axis on the chart corresponds to the deflection of the structure due to the impulse. Conceptually, the deflections are like the deflections of a guitar string when plucked, i.e., imparted with an impulse. Typically, the circuit supporting substrates 454, 456, may have a natural frequency of vibration ranging from 200 to 300 Hz, resulting in a deflection 302 (FIG. 3) of approximately 0.14 inches. The natural vibration frequency response of the housing front and back planes 240, 242 may be approximately 390 Hz, resulting in a deflection 304 of approximately 0.07 inches.

FIG. 4 is a cross-sectional view of the pager housing 222 having front and back planes 240, 242. Further, two circuit supporting substrates 454, 456, are mechanically coupled to the housing 222. The circuit supporting substrates, 454, 456, are shown deflecting 458 approximately 0.14 inches, in response to a mechanical shock impulse on the pager housing 222, representative of a forty eight inch drop of the pager housing 222 onto a concrete and steel floor. The front and back planes 240, 42 of the housing 222, similarly, are shown deflecting approximately 0.07 inches in response to the same mechanical shock. As can be seen, several secondary impact zones 462, 464, 466, are created due to the large deflections of the structures in the pager housing 222. Hence, for example, any components mechanically coupled to the circuit supporting substrates 454, 456, are subjected not only to the primary impact due to the forty eight inch drop of the pager housing 222, but they are also subjected to secondary impacts. These primary and secondary impacts can result in damage to components which result in unit failures, as discussed earlier. Therefore, it is desirable to minimize the number of impacts on the components to enhance the reliability of the electronic device.

A first solution may be to increase the distance between the deflecting structures in the pager housing 222, to allow them to deflect without secondary impacts. This approach is not always feasible in reduced volume devices, such as pagers in credit-card format. Clearly, the size of the pager does not allow the larger distances between the deflecting structures.

Figure 5:
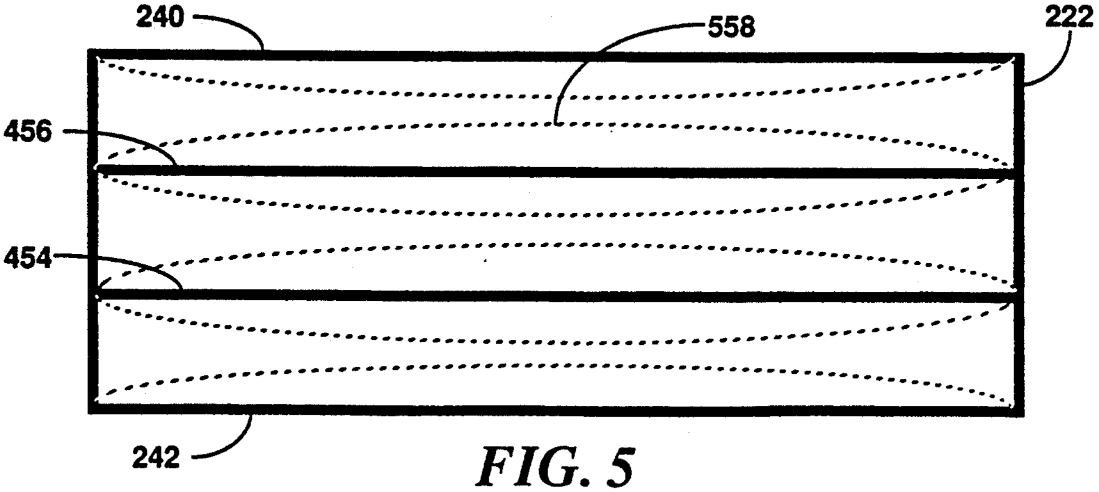
FIG. 5 is a cross-sectional view of a pager housing having front and back planes and two circuit supporting substrates, illustrating deflections with no secondary impact zones, according to the present invention.

The second solution, consistent with the teachings of the present invention, is to reduce the deflection distance of the deflecting structures in the pager housing 222. By locating a mechanical shock isolator in the void area between the deflecting structures in the pager housing 222, the natural frequency of vibration of the structures can be increased 306 (FIG. 3), such as to approximately 2000 Hz, to reduce the deflection distance to approximately 0.015 inches. FIG. 5 illustrates the front and back planes 240, 242, of the pager housing 222, and the two circuit supporting substrates 454, 456, deflecting with no secondary impact zones. As shown, the circuit supporting substrate 456 deflects 558 only approximately 0.015 inches, while it previously deflected 458 (FIG. 4), 0.14 inches. Similarly, the front and back planes 240, 242, are shown deflecting approximately 0.015 inches, while they previously deflected approximately 0.07 inches. The improvement is attained by using one or more mechanical shock isolators between the two circuit supporting substrates 454, 456, and also between the front and back planes 240, 242, of the housing 222 and the respective circuit supporting substrates 456, 454, as will be more fully discussed below.

Figure 6:
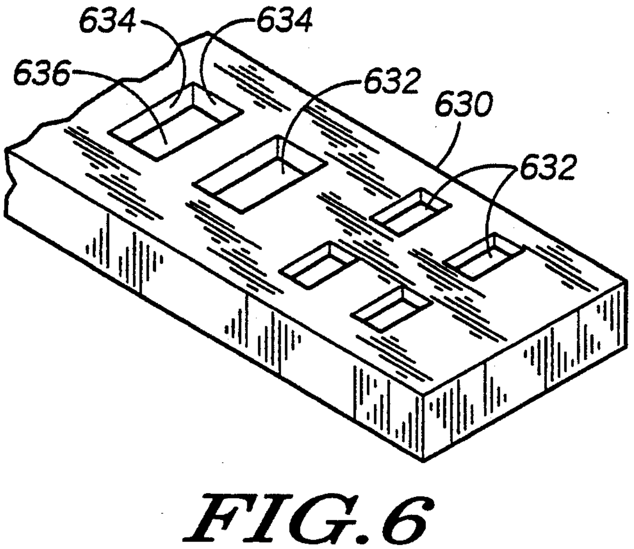
FIG. 6 is an isometric view of a mechanical shock isolator or snubber, in accordance with a preferred embodiment of the present invention.

FIG. 6 is an isometric view of a mechanical shock isolator or snubber 630 for use in achieving the objectives of the present invention. According to the preferred embodiment of the present invention, the snubber 630 comprises a piece of damping material having a desired durometer and configuration so as to raise a natural frequency of vibration (and therefore reduce the amount of deflection due to shock) of a selective call receiver housing and a circuit supporting substrate or printed circuit board positioned therein, as discussed earlier. The snubber 630 may be manufactured by molding elastomeric materials, such as polyurethane or butyl rubber. However, any elastomeric materials possessing the required characteristics of damping and stiffness are suitable for use in accordance with the teachings of the present invention. In accordance with the preferred embodiment of the present invention, the material should have a damping factor of at least 25% (preferably 50%) and exhibit a durometer of between 50 to 70 (type A), and preferably 60 (type A). Further, the snubber material should be sulfur-free so as not to attack the electronic components on the printed circuit board, should be carbon-free so as to be non-conductive, and should not attack or degrade the polycarbonate pager housing.

Butyl rubber is a preferred material, which provides superior results. One advantage of using butyl rubber is its tolerance to higher temperatures used during reflow soldering assembly of the pager. Some alternatives for the product manufacturing and assembly process will be discussed below.

Referring again to FIG. 6, it can be seen that the snubber 630 contains a plurality of component receiving pockets or apertures 632. Each pocket 632 has side walls 634, and preferably a base 636. This provides component-to-component isolation in the five planes protected by the four sides 634 and the base 636. The mechanical shock isolator 630 and pockets 632 are preferably formed during the molding process, as will be more fully discussed below.

Figure 7:
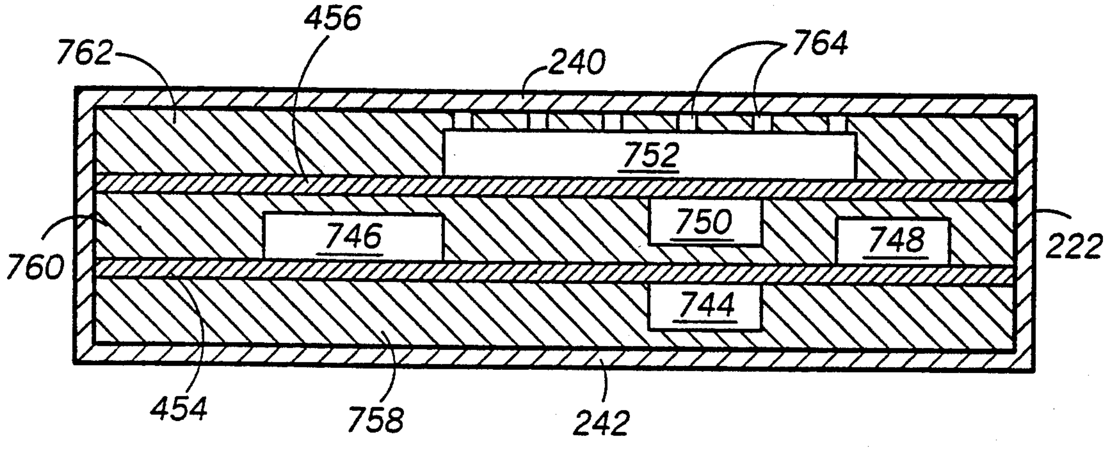
FIG. 7 is a cross-sectional view of a paging device incorporating a mechanical shock isolator of the type shown in FIG. 6.

FIG. 7 is a cross-sectional view of a paging device 100, such as illustrated in FIG. 1, and having a housing 222, such as shown in FIG. 2. The pager housing 222 has front and back planes 240 and 242 (FIG. 2), respectively. At least a portion of the electronic circuitry for the pager 100 is shown as components 744, 746, 748, 750, 752, mounted on the printed circuit boards 454, 456. These components 744, 746, 748, 750, 752, may include the radio receiver circuitry 110 (FIG. 1), the microcomputer decoder 114, and the output annunciator 116, as well as other electronic circuitry performing functions for the pager 100. Additionally, while two printed circuit boards 454, 456, are shown for convenience, it should be clear that the electronic device could include less than or more than two circuit supporting substrates or printed circuit boards.

Three mechanical shock isolators or snubbers 758, 760, 762, are used in the device shown in FIG. 7. The first mechanical shock isolator 758 occupies the space between back plane 242 and the first printed circuit board 454, and includes a pocket for receiving a component 744. The second mechanical shock isolator 760 occupies the space between the first and second printed circuit boards 454, 456, and includes pockets for receiving several components 746, 748, 750. The third mechanical shock isolator 762 is positioned between the second printed circuit board 456 and the front plane 240, and includes a pocket to receive a component 752.

One advantage of the snubbers 758, 760, 762, is that they can substantially fill the interior of the pager housing 222, and therefore replace the large volume of air normally there. This arrangement tends to reduce the formation of condensation in the pager housing 222, which can otherwise adversely affect the electrical operation of the electronic device. Furthermore, it prevents contaminants, such as water, from entering the pager housing 222 and occupying these otherwise void regions, likewise causing device failure. In addition, the snubbers reduce thermal shock to the components by absorbing abrupt changes in temperature to reduce the affect thereon.

A major advantage of employing the mechanical shock isolators 758, 760, 762, as illustrated in FIGS. 6 and 7, is that the natural frequency of vibration of the housing 222 and the printed circuit boards 454, 456, can be substantially raised, for example, to approximately 2,000 Hz, thus reducing deflections to approximately 0.015 inches. The snubbers 758, 760, 762 essentially can fill at least a portion of the void areas between the deflecting structures, such as the printed circuit boards 454, 456, and the front and back planes 240, 242, of the housing 222, to provide dampening to the natural vibrations of the deflecting structures. This dampening raises the natural frequency of vibration of the housing 222 and the printed circuit boards 454, 456. As illustrated in FIG. 3, the higher frequency of vibration 306, e.g., 2000 Hz, corresponds to a smaller deflection, e.g., approximately 0.015 inches. Therefore, by selecting the snubber material, construction, and arrangement within the pager housing 222, the mechanical system comprising the pager housing 222, the printed circuit boards 454, 456, and the snubbers 758, 760, 762, can be "tuned" to deflections that can avoid secondary impacts, as illustrated earlier with discussion to FIGS. 4 and 5. Consequently, by reducing the number of impacts experienced by the components 744, 746, 748, 750, 752, this mechanical shock isolating arrangement provides a significant improvement in the overall reliability of the pager 100. That is, the electronic device is able to continue to function properly after sudden mechanical shocks, such as created by dropping the unit onto a hard surface. Clearly, the snubber arrangement provides printed circuit board-to-housing wall isolation, printed circuit board-to-printed circuit board isolation, and component-to-component isolation.

Additionally, there may be a variable frequency response across each of the printed circuit boards 454, 456. This may be partially due to the varying mass across the printed circuit boards 454, 456, such as due to the components 744, 746, 748, 750, 752, mounted thereon, respectively. Frequency adjustment for any particular area of each printed circuit board 454, 456, can be obtained by increasing or decreasing the contact area between the mechanical shock isolators 758, 760, 762, and the respective printed circuit boards 454, 456.

For example, as shown in FIG. 7, the deflection of the second printed circuit board 456 in the region of the component 752 will not be dampened by the snubber 762 to the same degree as the remainder of the printed circuit board 756. This localized adjustment in the natural mechanical frequency of a portion of the printed circuit board 756 is provided by the apertures 764 in the mechanical shock isolator 762, which can be formed in the mechanical shock isolator 762 during the molding process. These apertures 764 allow more deflection, i.e., lower natural frequency of vibration, in specific portions of the printed circuit board 756, such as permitted by the clearing distances between the adjacent deflecting structures in the pager housing 222. The additional deflection can provide more of a cushion effect and hence can reduce the impact force on the component 752. Therefore, a more fragile component 752, can be located in a portion of the pager housing 222 allowing more deflection distance between deflecting structures.

Optionally, the mechanical system designer can selectively locate the apertures 764 to tune the mechanical system to eliminate the variable frequency response across each of the vibrating structures in the pager housing 222. This tuning process, for example, can reduce the variability of frequency response across the circuit supporting substrates 454, 456, to a relatively homogeneous frequency response for each. Further, the tuned frequency response for each of the circuit supporting substrates 454, 456 can reduce the number of vibration cycles (number of deflections) experienced by the circuit supporting substrates 454, 456, in response to a mechanical shock or impact. This reduces the potential for secondary impacts, enhancing reliability.

Another advantage of the construction of the snubbers 758, 760, 762, with the component pockets 632, such as illustrated in FIG. 6, is that the mechanical shock isolators 758, 760, 762, can be self-positioning, reducing the possibility for misplacement or misalignment in the pager housing 222. Further, the self-aligning snubbers 758, 760, 762, assure that the apertures 764 (FIG. 7) reside in the proper region within the pager housing 222. Additionally, the simplified assembly process lends itself well to automated or robotic manufacturing methods.

In another broad aspect of the preferred embodiment of the present invention, the enhanced reliability of the electronic device, e.g., the selective call receiver 100, is maintained by assuring that the mechanical shock isolator is not misplaced or missing in the housing 222. Preferably, the selective call receiver 100 can monitor the mechanical shock isolator and provide an alert after determining that the mechanical shock isolator is missing or misplaced in the housing 222. This alert can indicate to a technician in a manufacturing process, for example, that the selective call receiver 100 is defective, i.e., that the mechanical shock isolator is not in place. The technician can then repair the device before final delivery to an end user. In this way, the end user receives a device having the mechanical shock isolator in place, thereby assuring the reliability of the electronic device during use. The construction and operation of the preferred embodiment of the present invention, in accordance with this broad aspect, will be more fully discussed below.

Figure 8:
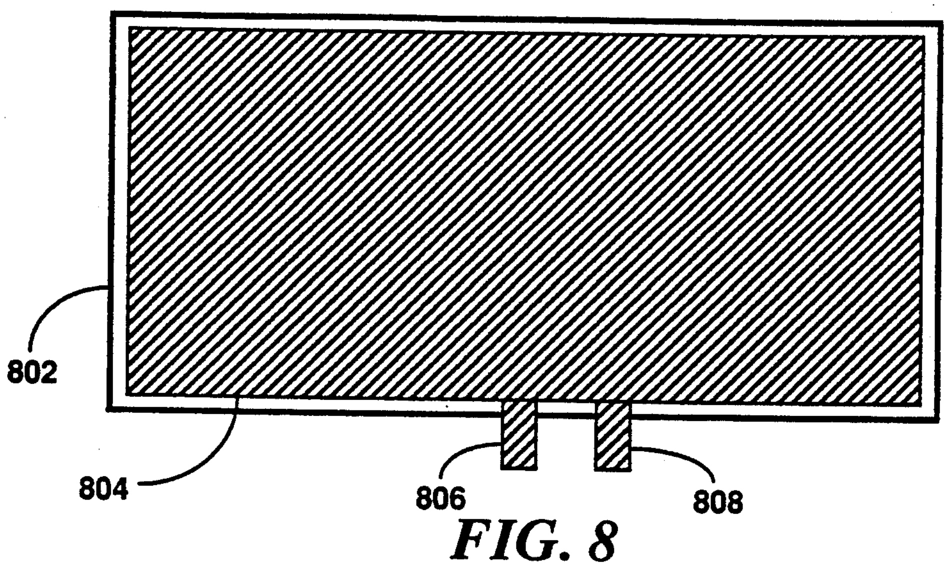
FIG. 8 is a top cut-away view of a circuit carrying mechanical shock isolator, according to the preferred embodiment of the present invention.

FIG. 8 is a top cut-away view of a circuit carrying mechanical shock isolator 802, according to the preferred embodiment of the present invention. The mechanical shock isolator or snubber 802 preferably includes an electrically conductive structure, e.g., layer 804, within the snubber material. Although, it is clear, that other arrangements of the electrically conductive structure 804 in the snubber 802 are possible. For example, the electrically conductive structure 804 may be located at an outer surface of the snubber 802, and it may not even necessarily be shaped as a layer 804. As shown in FIG. 8, however, the electrically conductive layer 804 is connected to at least one electrical contact 806, 808, that is accessible from outside the snubber 802. For example, first 806 and second 808 electrical leads are electrically connected to the electrically conductive layer 804 of the snubber 802. These leads 806, 808, can be soldered to electrical contacts in the pager 100, which allow electrical monitoring of the snubber 802 placement, as discussed further below.

The snubber 802 is constructed preferably from elastomeric material such as polyurethane and/or butyl rubber, in a molding process using known manufacturing techniques. The electrically conductive layer 804 can be molded in the elastomeric material, laminated on a molded elastomeric material, or even sprayed on a molded elastomeric material, using known manufacturing methods and techniques. Additionally, one or more leads or contact pads 806, 808, can be electrically connected to the electrically conductive structure 804 during the molding process. The pads 806, 808, provide an electrical path from outside the snubber 802 for electrically connecting the electrically conductive layer 804 with electrical contacts for the electronic circuitry of the device. Preferably, these pads 806, 808, are solder to the electrical contacts of the electronic circuitry during the manufacturing process. In a reflow soldering manufacturing process, the snubber 802 may have solder deposited on the pads 806, 808, via either printing solder paste, dispensing solder paste, or dispensing flux. Then, the snubber 802 can be placed robotically, or by an operator, where the leads 806, 808, are oriented with corresponding pads for the electronic circuitry of the electronic device. The final assembly then can be subjected to reflow soldering to secure the component parts, including the snubber 802, to a circuit supporting substrate. Subsequently, during unit testing, the snubber 802 can be monitored to determine if the snubber 802 is misplaced or missing. This can be accomplished with an electrical continuity test. The integrity of an electrical loop circuit formed with the electrically conductive structure 804 can be monitored to indicate the presence of the snubber 802 at the desired location. A lack of integrity of the electrical loop would indicate that the snubber 802 is misplaced or missing from the desired location. As mentioned earlier, butyl rubber is the preferred elastomeric material for the reflow soldering manufacturing process because it tolerates the higher temperatures used during reflow soldering assembly of the electronic device.

In an alternative manufacturing process, the snubber 802 can be assembled with the electronic device in a nonreflow soldering process. In this case, both polyurethane and butyl rubber are the preferred elastomeric materials. After the components for the electronic circuitry are placed on a circuit supporting substrate, the assembly typically is reflow soldered. Subsequently, a solder paste or flux may be dispensed on electrical contacts for the electronic circuitry. The snubber 802 can then be placed robotically, or by an operator, such that the leads 806, 808 can then be soldered to the electrical contacts of the electronic circuitry. The soldering can be done by either laser, hot bar, or focused infrared reflow soldering. Of course, the snubber 802 can be affixed by hand soldering operation. Subsequently, the electronic device can undergo final testing. As discussed before, the electrical integrity of an electrical loop circuit formed with the electrically conductive structure 804 would serve to indicate if the mechanical shock isolator 802 is missing or misplaced from the desired location.

Figure 9:
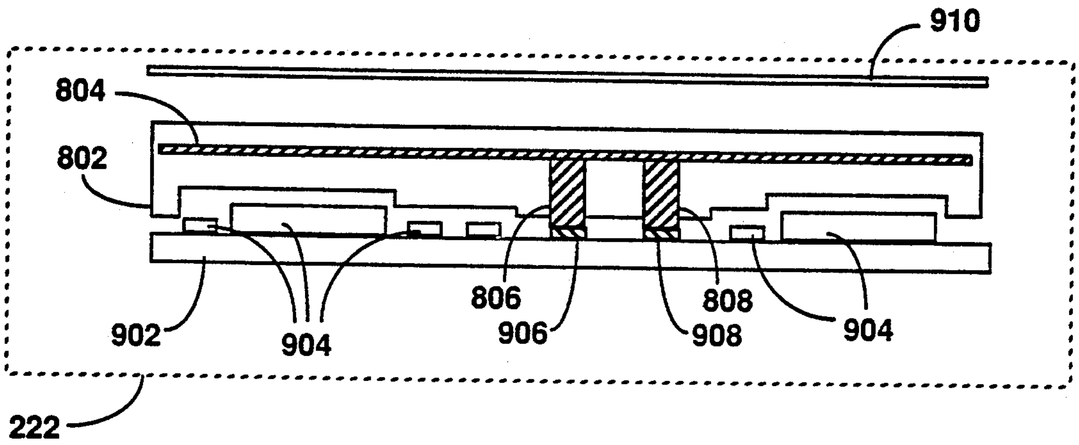
FIG. 9 is a side x-ray view of the circuit carrying mechanical shock isolator of FIG. 8, the circuit carrying mechanical shock isolator being shown in a pager.

FIG. 9 is a side x-ray view of the circuit carrying mechanical shock isolator 802 in the pager housing 222, in accordance with the preferred embodiment of the present invention. As discussed earlier, the pager 100 may include one or more circuit supporting substrates, e.g., printed circuit boards 902, in the pager housing 222. At least a portion of the electronic circuitry for the pager 100 is shown as components 904 mounted on the printed circuit board 902. These components 904 may include the radio receiver circuitry 110 (FIG. 1), the micro computer decoder 114, and the output annunciator 116, as well as other electronic circuitry performing functions for the pager 100. As can be seen in FIG. 9, two electrical contacts 906, 908, on the printed circuit board 902 are electrically connected to the leads 806, 808 of the snubber 802. An electrical loop circuit can be formed through the electrically conductive structure 804 in the snubber 802 for sensing the presence of the snubber 802 in a desired location. A lack of integrity of the electrical loop circuit indicates that the snubber 802 is misplaced or missing from the desired location. Also shown in FIG. 9 is another deflecting structure 910 in the pager housing 222, which is located in close proximity to the snubber 802 and the circuit supporting substrate 902 arrangement. The second deflecting structure 910 may comprise a plane on the pager housing, a second circuit supporting substrate, or even an antenna structure in the pager housing 222. The snubber 802, as discussed before, serves to increase the mechanical frequency response of the circuit supporting substrate 902 to reduce the deflections thereof. This in turn helps reduce the number of secondary impacts experienced by the components 904 on the printed circuit board 902, thereby enhancing the reliability of the device.

Although the electrically conductive structure 804 can serve to indicate the presence of the snubber 802 in a desired location in the pager 100, it can also serve other purposes for the device. For example, the at least one electrical contact 906, 908, of the electronic circuitry 904 on the printed circuit board 902 can be connected to a reference voltage potential, e.g., ground, to provide an electrical shield, e.g., a ground plane, for shielding the electronic circuitry 904 of the device 100. Because the proper placement of the snubber 802 can be monitored at a specified time, such as during a diagnostic procedure or a power up sequence, the electrically conductive structure 804 can serve other purposes, such as a ground plane, at other times. Preferably, the microcomputer 114 can selectively control a switch (not shown) to either selectively monitor the presence of the snubber 802, or utilize the electrically conductive structure 804 for the alternative function. Optionally, the electrically conductive structure 804 can serve as an antenna for the radio receiver circuitry 110. The antenna structure 804 could be electrically coupled to the radio receiver circuitry 110 via the electrical contacts 906, 908 soldered to the leads 806, 808. By additionally utilizing the existing electrically conductive structure 804 for these alternative functions, the pager designer can better utilize the available space in the pager housing 222, which would otherwise be wasted.

Figure 10:
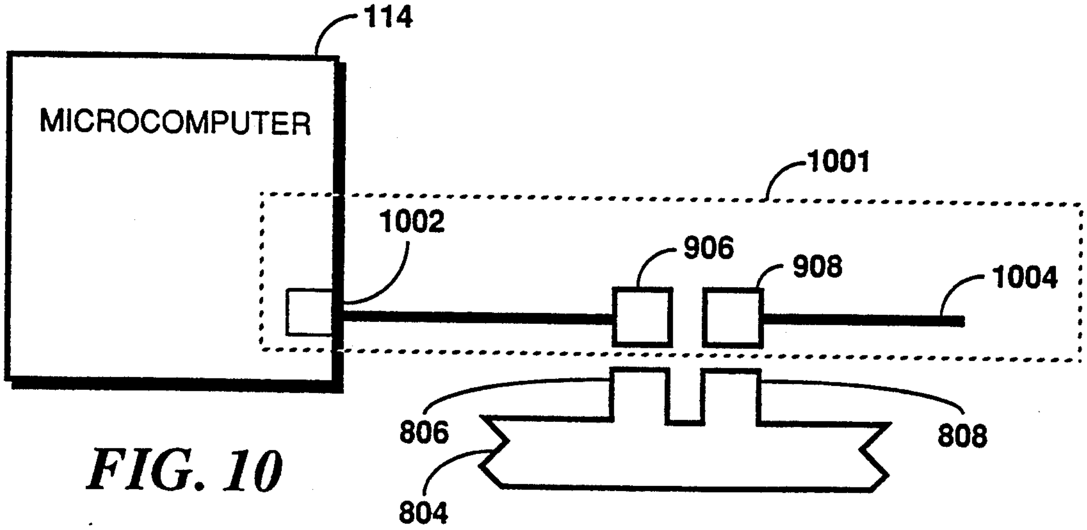
FIG. 10 is an electrical block diagram of the circuit supporting mechanical shock isolator of FIG. 9 and a sensing circuit, in accordance with the preferred embodiment of the present invention.

FIG. 10 illustrates a portion of an electrical block diagram or sense circuit 1001 for sensing the integrity of the electrical loop circuit formed with the electrically conductive structure 804 in the snubber 802 in accordance with the preferred embodiment of the present invention. A port line 1002 of the microcomputer 114 is electrically coupled to one of the electrical contacts 906 on the printed circuit board 902. The other one of the electrical contacts 908 is electrically coupled to a reference voltage potential 1004. When the leads 806, 808 of the electrically conductive structure 804 are making electrical contact with the pads 906, 908, on the printed circuit board 902, the microcomputer 114 can sense the integrity of the electrical loop circuit formed through the electrically conductive structure 804. For example, if the snubber 802 is in place, the microcomputer 114 would sense the presence of the reference voltage potential 1004 at the port line 1002. On the other hand, if the snubber 802 were misplaced or missing from the desired location, there would be an open circuit between the electrical contacts 906, 908, on the printed circuit board 902. This can also be sensed by the microcomputer 114 at its port line 1002. In this way, the microcomputer 114 can determine when the electrically conductive structure 804 forms an electrical loop circuit shorting across the electrical contacts 906, 908, on the printed circuit board 902. That is, the microcomputer 114 can determine if the snubber 802 is misplaced or missing in the desired location.

Figure 11:
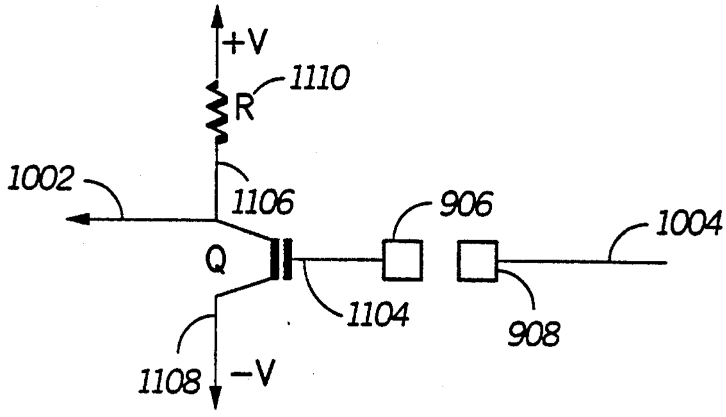
FIG. 11 is a partial electrical schematic diagram showing an optional modification to the sensing circuit of FIG. 10, according to the preferred embodiment of the present invention.

FIG. 11 is a partial electrical schematic diagram showing an optional modification to the sensing circuit 1001 of FIG. 10, according to the present invention. Here, an isolating transistor Q electrically couples the sense signal from one of the electrical contacts 906 on the printed circuit board 902 to the port line 1002 in the microcomputer 114. The gate 1104 of an FET transistor, for example, can control the drain 1106 to source 1108 voltage, to present to the port line 1002 either a positive voltage potential (+V) through a pull-up resistor 1110, or a negative voltage potential (−V) present at the source 1108. The gate 1104 is controlled by the sense signal coupled from the electrical contact 906. By using the transistor switch, the sense signal presented to the microcomputer port line 1002 is essentially either the positive voltage potential (+V) or the negative voltage potential (−V).

Figure 12:
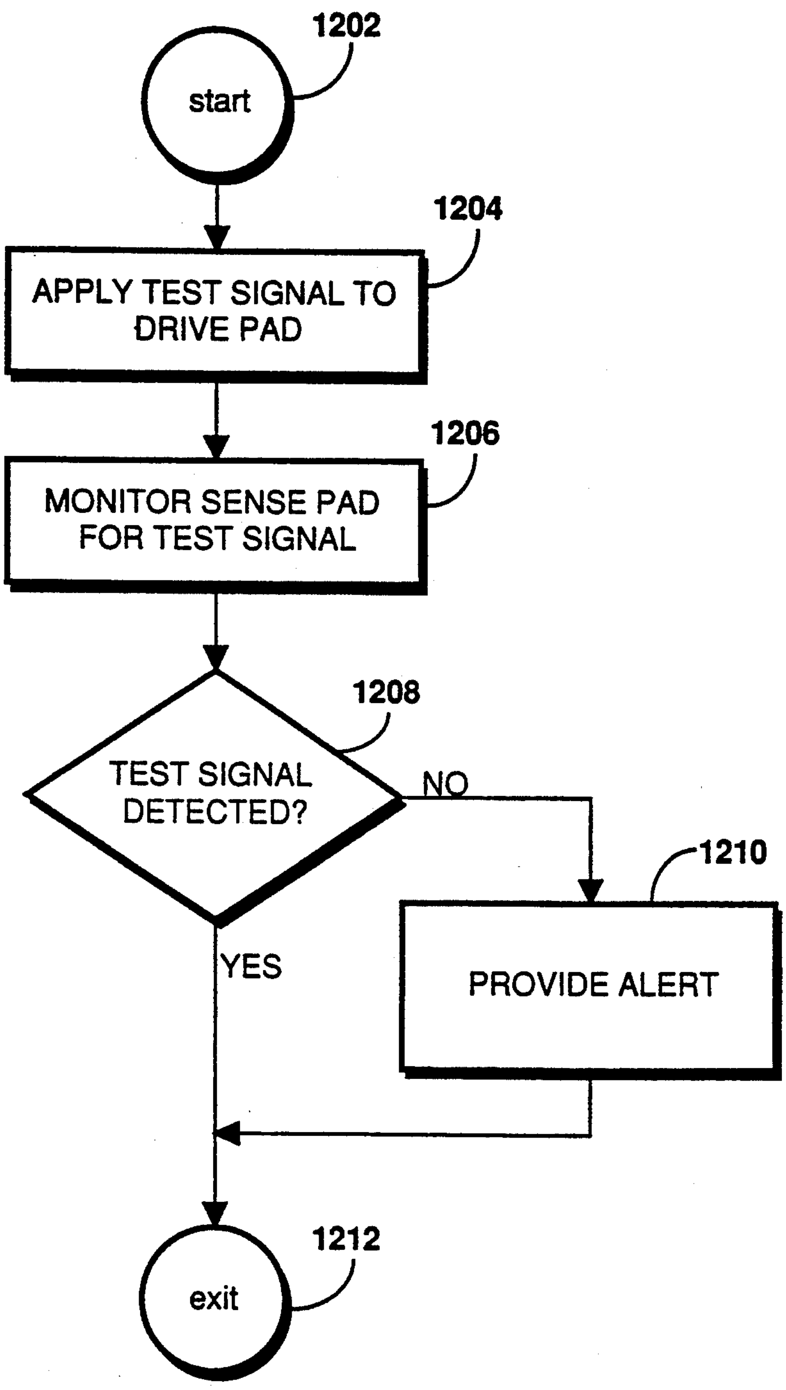
FIG. 12 is a flow diagram illustrating an operational sequence for a microcomputer for monitoring the circuit carrying mechanical shock isolator of FIG. 10, in accordance with the present invention.

FIG. 12 is a flow diagram illustrating an operational sequence for the microcomputer 114 for monitoring the presence of the snubber 802 at the desired location. To test the electrical integrity of the electrical loop circuit formed when the electrically conductive structure 804 is shorting across the electrical contact pads 906, 908, (FIG. 10) on the printed circuit board 902, the microcomputer 114 applies a test signal to one of the pads 908 on the printed circuit board 902. For example, the microcomputer 114 may control a switch (not shown) to switch in a reference voltage potential at the drive pad 908. After applying 1202, 1204 a test signal to the drive pad 908, the microcomputer 114 can monitor 1206 the sense pad 906 via the port line 1002. If the test signal is detected 1208 at the sense pad 906, the microcomputer 114 can exit 1212 the diagnostic routine without incident. On the other hand, if the test signal is not detected 1208, then the microcomputer 114 provides an alert 1210, such as via the annunciator 116. This can alert a technician to a potential defect in the unit. That is, it serves to indicate that the snubber 802 is not in the desired location. Optionally, the microcomputer 114 can set a flag internally to inhibit any normal functions for the pager 00 until the snubber 802 is determined to be in the desired location. After alerting 1210 that the snubber 802 may be misplaced or missing from the desired location, the microcomputer 114 can then exit 1212 the diagnostic routine to possibly perform other functions in the pager 100, or other diagnostic routines. In this way, the technician may be alerted to a potential defect in a manufacturing process before the final product is delivered to the customer.

Thus, the inventive shock isolation technique will result in a more reliable selective call receiver 100 by allowing the designer to define the required frequency response needed for minimum deflection of both the circuit supporting substrates 902 and the housing 222. Further, the final design can also eliminate the variable frequency response across the printed circuit boards 902, and the number of vibration cycles will be reduced. Furthermore, the shock isolation material will occupy the space normally occupied by air thus reducing failures due to condensation, and assisting in preventing contaminants from entering the housing 222. Lastly, the mechanical shock isolator 802 can be monitored by the selective call receiver 100 to determine if the mechanical shock isolator 802 is misplaced or missing in the housing 222.

What is claimed is:

1. A selective call receiver for receiving transmitted messages, comprising:

a housing;

a circuit supporting substrate within the housing and mechanically coupled thereto;

electronic circuitry, at least a portion of which being mechanically coupled to the circuit supporting substrate, including at least one of:

receiving means for receiving a message comprising an address;

decoding means coupled to the receiving means for decoding the received message, and for determining if the received address matches a predetermined address; and alert means coupled to the decoding means for generating an alert if the received address matches the predetermined address; and mechanically shock isolation means within the housing and mechanically coupled to the circuit supporting substrate for substantially increasing the natural frequency of vibration of the circuit supporting substrate, the mechanical shock isolation means including an electrically conductive layer being electrically coupled to the electronic circuitry, wherein the electronic circuitry includes control means capable of being electrically coupled to the electrically conductive layer of the mechanical shock isolation means to form an electrical loop circuit for sensing electrical integrity of the electrical loop circuit to determine when the mechanical shock isolation means is misplaced or missing in the housing.

2. The selective cell receiver of claim 1, wherein the mechanical shock isolation means substantially fills the empty space within the housing.

3. The selective call receiver of claim 1, wherein the mechanical shock isolation means comprises elastomeric material and the electrically conductive layer is constructed in the mechanical shock isolation means comprising one of constructions from the set of:

a) a conductive layer molded in the elastomeric material;

b) a conductive layer laminated on a molded elastomeric material; and c) a conductive layer sprayed on a molded elastomeric material.

4. The selective call receiver of claim 1, wherein the electrically conductive layer comprises an antenna electrically coupled to the receiving means for receiving the message comprising the address.

5. The selective call receiver of claim 1, wherein the electrically conductive layer is electrically coupled to the electronic circuitry at a reference voltage potential for providing an electrical shield thereto.

6. The selective cell receiver of claim 1, wherein the electronic circuitry includes loop integrity alert means responsive to the control means sensing a lack of integrity of the electrical loop circuit for providing an alert when the control means determines the mechanical shock isolation means is misplaced or missing in the housing.

7. The selective cell receiver of claim 1, wherein the mechanical shock isolation means comprises elastomeric material having a damping factor of at least 25% and a durometer of between 50 and 70, type A.

8. The selective cell receiver of claim 7, wherein the elastomeric material comprises material from at least one of the set of butyl rubber and polyurethane.

9. The selective cell receiver of claim 1, wherein the at least a portion of the electronic circuitry includes at least one component mounted on the circuit supporting substrate, and wherein the mechanical shock isolation means comprises an elastomeric body including at lest one component receiving aperture for receiving the at least one component.

10. The selective cell receiver of claim 9, wherein the elastomeric body cooperates with the circuit supporting substrate to substantially surround the at least one component.

11. A communication receiver for receiving transmitted messages, comprising:

a housing;

a circuit supporting substrate within the housing and mechanically coupled thereto;

electronic circuitry, at least a portion of which being mechanically coupled to the circuit supporting substrate, including receiving means for receiving a message; and mechanical shock isolation means within the housing and mechanically coupled to the circuit supporting substrate for substantially increasing the natural frequency of vibration of the circuit supporting substrate, the mechanical shock isolation means including an electrically conductive layer being electrically coupled to the electronic circuitry, wherein the electronic circuitry includes control means capable of being electrically coupled to the electrically conductive layer of the mechanical shock isolation means to form an electrical loop circuit for sensing electrical integrity of the electrical loop circuit to determine when the mechanical shock isolation means is misplaced or missing in the housing.

12. The communication receiver of claim 11, wherein the mechanical shock isolation means substantially fills the empty space within the housing.

13. The communication receiver of claim 11, wherein the mechanical shock isolation means comprises elastomeric material and the electrically conductive layer is constructed in the mechanical shock isolation means comprising one of constructions from the sets of:

a) a conductive layer molded in the elastomeric material;

b) a conductive layer laminated on a molded elastomeric material; and c) a conductive layer sprayed on a molded elastomeric material.

14. The communication receiver of claim 11, wherein the electrically conductive layer comprises an antenna electrically coupled to the receiving means for receiving the message.

15. The communication receiver of claim 11, wherein the electrically conductive layer is electrically coupled to the electronic circuitry at a reference voltage potential for providing an electrical shield thereto.

16. The communication receiver of claim 11, wherein the electronic circuitry includes loop integrity alert means responsive to the control means sensing a lack of integrity of the electrical loop circuit for providing an alert when the control means determines the mechanical shock isolation means is misplaced or missing in the housing.

17. The communication receiver of claim 11, wherein the mechanical shock isolation means comprises elastomeric material having a damping factor of at least 24% and a durometer of between 50 and 70, type A.

18. The communication receiver of claim 17, wherein the elastomeric material comprises material from at least one of the set of butyl rubber and polyurethane.

19. The communication receiver of claim 11, wherein the at least a portion of the electronic circuitry includes at least one component mounted on the circuit supporting substrate, and wherein the mechanical shock isolation means comprises an elastomeric body including at lest one component receiving aperture for receiving the at lest one component.

20. The communication receiver of claim 19, wherein the elastomeric body cooperates with the circuit supporting substrate to substantially surround the at least one component.

* * * * *

UNITED STATES PATENT AND TRADEMARK OFFICE

CERTIFICATE OF CORRECTION

PATENT NO. : 5,317,308

DATED : May 31, 1994

INVENTOR(S) : Tribbey et al.

It is certified that error appears in the above-indentified patent and that said Letters Patent is hereby corrected as shown below:

Column 11, line 53 delete "mechanically" and insert --mechanical--.
Column 12, line 41, after "at" delete "lest" and insert --least--.
Column 14, line 20, delete "lest" and insert --least--.
Column 14, line 21, delete "lest" and insert --least--.

Signed and Sealed this

Third Day of January, 1995

*Attest:*

BRUCE LEHMAN

*Attesting Officer*

*Commissioner of Patents and Trademarks*